3,385,879
THIOALKYL PHENYL CARBONATES
Karoly Szabo, Orinda, and Thomas B. Williamson, Santa Clara, Calif., assignors to Stauffer Chemical Company, New York, N.Y., a corporation of Delaware
No Drawing. Filed Oct. 20, 1965, Ser. No. 499,049
6 Claims. (Cl. 260—463)

This invention relates to certain new and novel mixed carbonates and their use as insecticides, miticides and herbicides. More specifically, this invention pertains to certain alkylthioalkyl substituted-phenyl carbonates and to the utility of said compounds in insecticidal, acaricidal and herbicidal compositions.

The compounds comprising the instant class correspond to the general formula

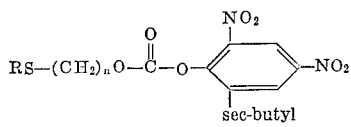

wherein R is a member selected from the group consisting of alkyl radicals containing from 1 to 10 carbon atoms, inclusive, phenyl and halophenyl; $n$ is a numeral up to 8. Also included is a method of preparing, using and applying said compositions.

The new compounds of this invention can be prepared by several methods. One such general method applied in preparing the compounds was the condensation reaction between the appropriate S-substituted thioalkyl chloroformate and 2,4-dinitro-6-sec-butylphenol. The addition of a hydrogen chloride acceptor is favorable in assisting the reaction. Compounds such as triethylamine, potassium carbonate, sodium carbonate and the like may be used as hydrogen chloride acceptors. The reaction proceeds readily in the liquid phase. The employment of an inert organic solvent is also useful, facilitating processing as well as agitation of the reactants. Temperatures that permit operation in the liquid phase and which allow controllable reaction conditions are employed. Preferably the reaction mixture is refluxed, usually at the reflux temperature of the solvent, if any is used.

It has been found that the compounds of the present invention are particularly effective as insecticides, acaricides and herbicides.

The compounds of the present invention may be made in accordance with the following example.

EXAMPLE

Preparation of ethylthioethyl-(2,4-dinitro-6-sec-butylphenyl)carbonate

Into a 3-neck flask fitted with a stirrer, a thermometer, and a dropping funnel were added together 10.1 g. (0.06 mole) of ethylthioethylchloroformate, 14.4 g. (0.06 mole) of 2,4-dinitro-6-sec-butylphenol in 80 ml. of acetone as a solvent. To this solution was added 6.1 g. of triethylamine. An exothermic reaction took place and triethylamine·hydrochloride began to form immediately. The reaction mixture was stirred and heated to reflux for about one hour. It was then allowed to cool to room temperature. The triethylamine·hydrochloride was filtered off. The liquid portion was extracted with methylene chloride, dried over anhydrous magnesium sulfate and the solvent removed with a vacuum rotary evaporator.

There was obtained 22.1 g. (99.0 percent of theory) of the title compound, $n_D^{21°}=1.5675$.

The following is a table of the compounds prepared according to the aforedescribed procedure. Compound numbers have been assigned to each compound and are used throughout the balance of the application.

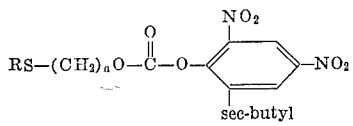

TABLE I

| Compound Number | n | R | $n_D/°$ C. |
|---|---|---|---|
| 1[1] | 2 | Ethyl | 1.5675/21 |
| 2 | 2 | Methyl | 1.5374/23 |
| 3 | 2 | n-Propyl | 1.5216/22 |
| 4 | 2 | n-Butyl | 1.5200/22 |
| 5 | 2 | n-Amyl | 1.5065/22 |
| 6 | 2 | n-Hexyl | 1.5115/24 |
| 7 | 2 | n-Octyl | 1.5072/22 |
| 8 | 2 | Phenyl | 1.5717/22 |
| 9 | 6 | Ethyl | 1.5146/22 |
| 10 | 3 | i-Propyl | 1.5140/24 |
| 11 | 2 | p-Chlorophenyl | 1.5783/24 |

[1] No. 1 prepared in the example.

As previously mentioned, the herein described compositions produced in the above-described manner are biologically active compounds which are useful and valuable in controlling various pest organisms. The compounds of this invention were tested in the following manner.

Acaricidal Evaluation Test.—The two-spotted mite, *Tetranychus telarius* (Linn.), was employed in tests for miticides. Young pinto bean plants in the primary leaf stage were used as the host plants. The young pinto bean plants were infested with several hundred mites. Dispersions of candidate materials were prepared by dissolving 0.1 gram in 10 ml. of a suitable solvent, usually acetone. Aliquots of the toxicant solutions were suspended in water containing 0.0175% v./v. Sponto 221®, an emulsifying agent, the amount of water being sufficient to give concentrations of active ingredient ranging from 0.25% to 0.0008%. The test suspensions were then sprayed on the infested pinto bean plants. After seven days, mortalities of post-embryonic and ovicidal forms were determined. The percentage of kill was determined by comparison with control plants which had not been sprayed with the candidate compounds. The LD–50 value was calculated using well-known procedures. These values are reported under the columns "PE" and "Eggs" in Table II.

TABLE II

| Compound Number | Acaricidal Activity, Two-Spotted Mite | |
|---|---|---|
|  | PE, percent | Eggs, percent |
| 1 | .003 | .03 |
| 2 | .005 | .005 |
| 3 | .005 | .008 |
| 4 | .005 | .01 |
| 5 | .01 | .03 |
| 6 | .01 | .03 |
| 7 | .008 | .05 |
| 8 | .008 | .008 |
| 9 | .008 | .03 |
| 10 | .003 | .008 |
| 11 | .008 | .03 |

Salt-marsh caterpillar.—*Estigmene acrea* (Drury), was found to have an LD–50 of 0.05 percent and 0.08 percent for compounds number 3 and 4, respectively.

The herein contemplated new compositions were also found to be effective as herbicides. They are particularly effective in the control of grasses and broadleaf plants with both pre-emergence and post-emergence activity. The compounds are phytotoxic and find utility in controlling various plant species. When applied at 20 pounds per acre compounds number 1 and 2 showed 85 to 100% pre-emergence control of crab grass, annual bluegrass and watergrass. Also at 20 pounds per acre in pre-emergence application, compounds number 1, 2 and 4 gave 85 to 100% control of the broadleaf species: pigweed, mustard and curled dock. When applied in a post-emergent manner at a rate of 12.5 pounds per acre all of the compounds gave 85 to 100 percent control of mustard and curled dock. Compounds 1, 2, 4, 6, 8 and 10 gave 85 to 100 percent post-emergence control of crab grass when applied at 12.5 pounds per acre.

The compounds of the present invention may be used as effective insecticides, acaricides and herbicides, and may be applied in a variety of ways at various concentrations. In practice the compounds are usually formulated with an inert adjuvant, utilizing methods well-known to those skilled in the art, thereby making them suitable for application as dusts, sprays or drenches and the like. The amount applied will depend upon the nature of the insects, weeds or seeds to be controlled. The rate of application may vary from 1 to 50 pounds per acre. The particular method of application to an insect's habitat of compositions comprising the compounds of the present invention are well-known to those skilled in the art. One advantageous way of applying the herbicidal compositions comprising an adjuvant and an effective amount of a compound herein described is as a narrow band along a row crop, straddling the row.

In the preferred embodiment of the instant invention the sum of the carbon atoms contained in R and the alkylene radical of the general formula supra is up to 12 since in general such compounds have the higher biological activity.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound of the formula

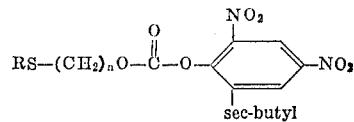

wherein R is a member selected from the group consisting of alkyl radicals, containing from 1 to 10 carbon atoms, inclusive, phenyl and chlorophenyl; $n$ is an integer up to 8.

2. The compound, ethylthioethyl-(2,4-dinitro - 6 - sec-butylphenyl) carbonate.

3. The compound, n-octylthioethyl-(2,4-dinitro-6-sec-butylphenyl) carbonate.

4. The compound, phenylthioethyl-(2,4-dinitro-6-sec-butylphenyl) carbonate.

5. The compound, ethylthiohexyl-(2,4-dinitro-6-sec-butylphenyl) carbonate.

6. The compound, p-chlorophenylthioethyl-(2,4-dinitro-6-sec-butylphenyl) carbonate.

No references cited.

CHARLES B. PARKER, *Primary Examiner.*

L. C. MARUZO, *Assistant Examiner.*

Disclaimer 3,385,879.—*Karoly Szabo*, Orinda, and *Thomas B. Williamson*, Santa Clara, Calif. THIOALKYL PHENYL CARBONATES. Patent dated May 28, 1968. Disclaimer filed Dec. 21, 1970, by the assignee, *Stauffer Chemical Company*.

Hereby enters this disclaimer to claims 1, 2, 3 and 5 of said patent.
[*Official Gazette April 20, 1971.*]